United States Patent [19]

Mori

[11] 4,311,367

[45] Jan. 19, 1982

[54] WIDE ANGLE PHOTOGRAPHIC LENS

[75] Inventor: Ikuo Mori, Kawasaki, Japan

[73] Assignee: Nippon Kogaku K.K., Tokyo, Japan

[21] Appl. No.: 94,725

[22] Filed: Nov. 15, 1979

[30] Foreign Application Priority Data

Nov. 15, 1978 [JP] Japan .................... 53-139800
Apr. 26, 1979 [JP] Japan .................... 54-51977

[51] Int. Cl.³ ............................... G02B 13/04
[52] U.S. Cl. ........................ 350/461; 350/458; 350/462
[58] Field of Search ............... 350/214, 458, 461, 462

[56] References Cited

U.S. PATENT DOCUMENTS

| | | | |
|---|---|---|---|
| 3,870,400 | 3/1975 | Yamashita et al. | 350/214 |
| 3,923,369 | 12/1975 | Nakamura | 350/214 |
| 3,975,090 | 8/1976 | Lawson | 350/214 |
| 4,025,170 | 5/1977 | Kawamura | 350/214 |
| 4,029,397 | 6/1977 | Yamashita | 350/214 |

Primary Examiner—John K. Corbin
Assistant Examiner—Scott J. Sugarman
Attorney, Agent, or Firm—Shapiro and Shapiro

[57] ABSTRACT

A wide angle photographic lens comprises a divergent forward group and a convergent rearward group. The forward group has at least one negative meniscus lens component having its convex surface facing the object side. The rearward group has a diaphragm, at least one positive lens component disposed forwardly of the diaphragm, a biconcave negative lens component disposed rearwardly of the diaphragm, a positive meniscus lens component having its convex surface facing the image side, and a focusing lens member provided most adjacent to the image side. The focusing lens member has at least one lens movable in the direction of the optic axis. The focusing is effected by movement of the movable lens alone.

14 Claims, 25 Drawing Figures

WIDE ANGLE PHOTOGRAPHIC LENS

BACKGROUND OF THE INVENTION

1. Field of the Invention

This invention relates to a wide angle photographic lens, and more particularly to the focusing mechanism thereof.

2. Description of the Prior Art

Generally, focusing of a photographic lens to an object is effected by the so-called entire system shifting, wherein the entire lens system is moved relative to the film surface. However, the movement of the entire lens system requires the movement of an object having a great weight and, therefore, the structure of the lens barrel unavoidably becomes complicated and bulky. Also, in this case, variations in aberrations have been great and it has been impossible to maintain a sufficient image forming performance for objects at short distances. It is therefore known to vary a certain lens interval when focusing on a short distance object is effected. For example, U.S. Pat. No. 4,029,397 discloses separating the lens system into a forward group and a rearward group and effecting focusing by the movement of the rearward group alone. In this case, astigmatism is surely maintained substantially well corrected, but distortion remains to the same degree as that experienced in the conventional entire system shifting lens, or is increased above that in the negative direction. Since distortion is increased in proportion to the cube of the angle of view, variation in distortion is great and non-negligible in a wide angle lens. Moreover, in the wide angle lens disclosed in U.S. Pat. No. 4,029,397, the rearward group includes a relatively large number of lenses and, therefore, the moving mechanism has unavoidably become bulky and complicated.

SUMMARY OF THE INVENTION

It is an object of the present invention to provide a wide angle photographic lens which can be focused by a simple mechanism with distortion as well as astigmatism maintained in well corrected conditions.

The wide angle photographic lens according to the present invention is a so-called inverted telephoto type wide angle photographic lens comprising a divergent forward group and a convergent rearward group, and wherein the forward group has at least one negative meniscus lens component having its convex surface facing the object side and the rearward group has a diaphragm, at least one positive lens component disposed forwardly of the diaphragm, a biconcave negative lens component disposed rearwardly of the diaphragm, a positive meniscus lens component having its convex surface facing the image side, and a focusing lens member provided most adjacent, i.e., closest, to the image side. The focusing lens member has at least one lens movable in the direction of optical axis and the focusing is accomplished by movement of this movable lens alone.

The invention will become more fully apparent from the following detailed description of some embodiments thereof taken in conjunction with the accompanying drawings.

DESCRIPTION OF THE PREFERRED EMBODIMENTS

Figure 1A:
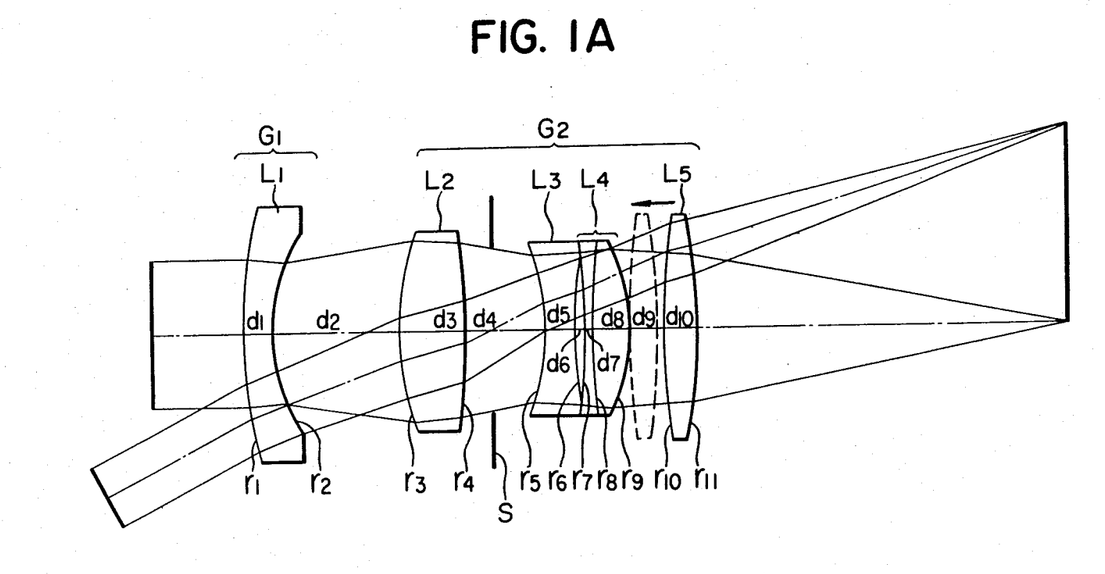
FIGS. 1A, 2A, 3A, 4A, 5A, 6A and 7A show lens constructions according to first, second, third, fourth, fifth, sixth and seventh embodiments of the present invention.

In FIG. 1A, which is a cross-sectional view of the lens system according to a first embodiment of the present invention, there are depicted light rays parallel to the optical axis and a light path of a light beam having a maximum angle of view of 28°.

A divergent forward group $G_1$ comprises a negative meniscus lens $L_1$ having its convex surface facing the object side, and a convergent rearward group $G_2$ comprises, in succession from the object side, a positive lens $L_2$, a diaphragm $S_1$ a biconcave lens $L_3$, a positive meniscus lens $L_4$ consisting of a doublet and having its convex surface facing the image side, and a biconvex positive lens $L_5$ as a focusing lens member. All the lenses except the biconvex positive lens $L_5$ most adjacent to the image side are fixed with respect to the image plane, and this biconvex positive lens $L_5$ is movable in the direction of the optic axis so that focusing is effected by the movement of this lens. The biconvex positive lens $L_5$ is the most adjacent, i.e., closest, lens component to the image side of the lens and lies at a position indicated by solid lines in the focused condition of an infinite object, and is moved toward the object side when focused to objects at shorter distances. It is at a position indicated by the dotted lines when focused to an object at the shortest distance.

Numerical data of the first embodiment will be shown below.

It is to be understood that $r_1, r_2, r_3, \ldots$ represent the curvature radii of the successive lens surfaces from the object side, $d_1, d_2, d_3, \ldots$ represent the center thicknesses of and the air spaces between the successive lenses, and $n_1, n_2, \ldots$ and $\nu_1, \nu_2, \ldots$ represent the refractive indices and the Abbe numbers, respectively, of the successive lenses. (These will also hold true in further embodiments.) The air space $d_9$ between the positive meniscus lens $L_4$ comprising a doublet and the positive lens $L_5$ most adjacent to the image side is 9.405 mm when the object distance is infinity, and 5.421 mm when the object distance is minimum, and the photographing magnification is $\beta = 1/30$.

| First Embodiment<br>Focal length f = 100mm, F-number 2.5, Angle of view 56° | | | |
|---|---|---|---|
| $r_1 = 144.045$ | $d_1 = 7.425$ | $n_1 = 1.50137$ | $\nu_1 = 56.5$ |
| $r_2 = 48.015$ | $d_2 = 33.908$ | | |
| $r_3 = 73.755$ | $d_3 = 17.325$ | $n_2 = 1.78797$ | $\nu_2 = 47.5$ |
| $r_4 = -275.468$ | $d_4 = 21.533$ | | |
| $r_5 = 62.865$ | $d_5 = 7.425$ | $n_3 = 1.75692$ | $\nu_3 = 31.7$ |
| $r_6 = 132.908$ | $d_6 = 2.871$ | | |
| $r_7 = -175.725$ | $d_7 = 1.980$ | $n_4 = 1.7847$ | $\nu_4 = 26.1$ |
| $r_8 = 309.375$ | $d_8 = 9.034$ | $n_5 = 1.78797$ | $\nu_5 = 47.5$ |
| $r_9 = -51.975$ | $d_9 = 9.405$ | | |
| $r_{10} = 371.25$ | $d_{10} = 7.425$ | $n_6 = 1.78797$ | $\nu_6 = 47.5$ |
| $r_{11} = -210.798$ | | | |
| Back focal length Bf = 98.547 | | | |

Figure 1B:
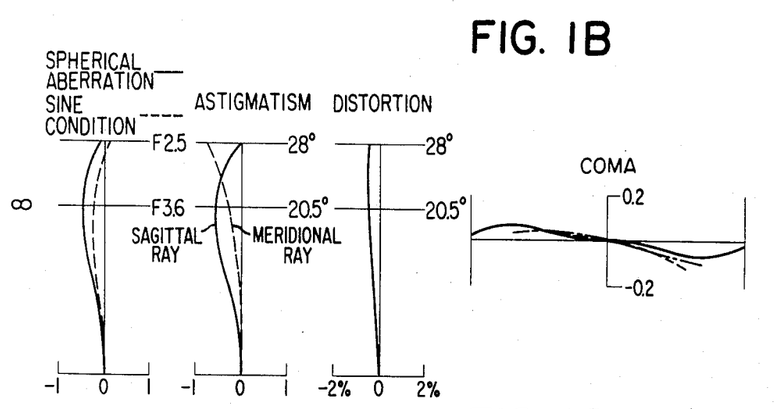
FIGS. 1B, 2B, 3B, 4B, 5B, 6B and 7B show various aberrations in the respective embodiments during infinity focusing.
Figure 1C:
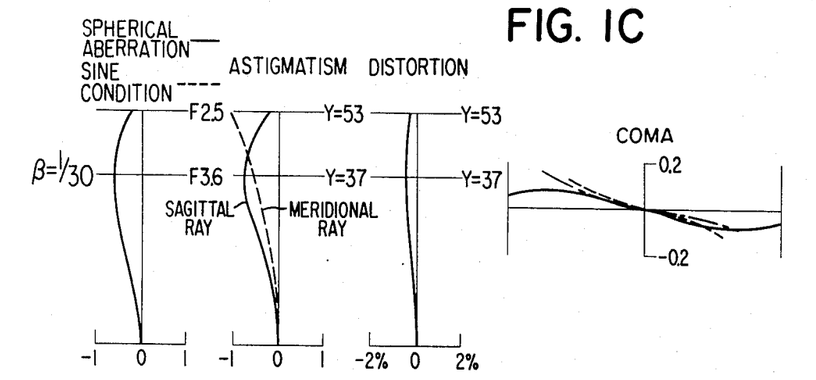
FIGS. 1C and 1D, 2C and 2D, 3C and 3D, 4C, 5C, 6C and 6D, and 7C show various aberrations in the respective embodiments during short distance focusing.
Figure 1D:
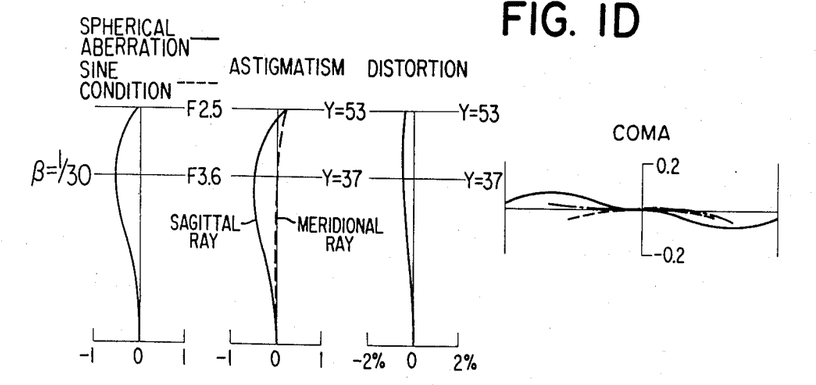

Various aberrations in the first embodiment when focused to an infinite object are shown in FIG. 1B, and various aberrations in the first embodiment when the photographing magnification $\beta = 1/30$ are shown in FIG. 1C. Also, various aberrations by the conventional entire system shifting lens when the photographing magnification $\beta = 1/30$ are shown in FIG. 1D for comparison. The amount of movement of the entire lens system necessary for the entire system shifting focusing to obtain the photographing magnification $\beta = 1/30$ is 3.323 mm.

As seen from these illustrations of aberrations, astigmatism becomes over-corrected in the entire system shifting focusing lens as the distance is shorter. On the other hand, according to the focusing mechanism of the present invention, both spherical aberration and astigmatism are varied in the negative direction. Distortion is corrected in the positive direction so that the increase in the negative direction, as in the case of the entire system shifting focusing according to the prior art, is prevented. Accordingly, as regards the tendency of the aberration variation resulting from focusing, it is apparent that the focusing mechanism of the present invention is more desirable, and the focusing action by the present embodiment substantially performs also the function of aberration correction with respect to the objects at short distances.

Figure 2A:
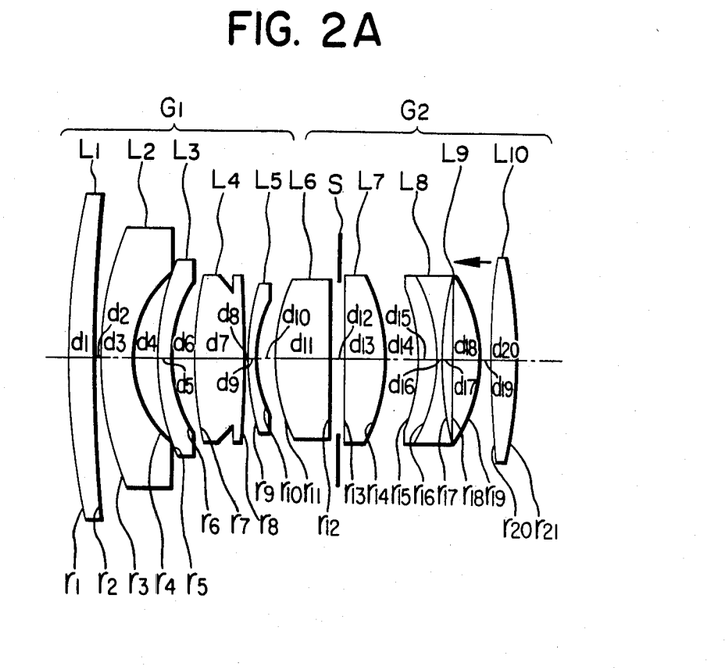

Also, in a second embodiment of the present invention as shown in FIG. 2A, as in the first embodiment, focusing can be effected by moving only a positive lens $L_{10}$ as the focusing lens member which is most adjacent to the image side.

Numerical data of the second embodiment will be shown below.

| Second Embodiment Focal length f = 100mm, F-number 2, Angle of view 84° | | | |
|---|---|---|---|
| $r_1 = 379.128$ | $d_1 = 17.122$ | $n_1 = 1.66557$ | $\nu_1 = 53.3$ |
| $r_2 = 1977.151$ | $d_2 = 0.815$ | | |
| $r_3 = 203.113$ | $d_3 = 17.937$ | $n_2 = 1.713$ | $\nu_2 = 53.9$ |
| $r_4 = 60.089$ | $d_4 = 13.657$ | | |
| $r_5 = 128.617$ | $d_5 = 5.3$ | $n_3 = 1.6968$ | $\nu_3 = 55.6$ |
| $r_6 = 64.003$ | $d_6 = 15.083$ | | |
| $r_7 = 247.45$ | $d_7 = 26.906$ | $n_4 = 1.65844$ | $\nu_4 = 50.8$ |
| $r_8 = -2561.328$ | $d_8 = 0.408$ | | |
| $r_9 = 157.479$ | $d_9 = 4.484$ | $n_5 = 1.6968$ | $\nu_5 = 55.6$ |
| $r_{10} = 93.762$ | $d_{10} = 8.969$ | | |
| $r_{11} = 125.461$ | $d_{11} = 31.39$ | $n_6 = 1.7495$ | $\nu_6 = 35.0$ |
| $r_{12} = -933.541$ | $d_{12} = 8.153$ | | |
| $r_{13} = -1844.376$ | $d_{13} = 20.791$ | $n_7 = 1.56384$ | $\nu_7 = 60.8$ |
| $r_{14} = -93.150$ | $d_{14} = 19.160$ | | |
| $r_{15} = -114.145$ | $d_{15} = 9.784$ | $n_8 = 1.74443$ | $\nu_8 = 49.4$ |
| $r_{16} = -102.73$ | $d_{16} = 3.261$ | $n_9 = 1.80518$ | $\nu_9 = 25.5$ |
| $r_{17} = 226.659$ | $d_{17} = 5.137$ | | |
| $r_{18} = -696.014$ | $d_{18} = 13.860$ | $n_{10} = 1.7481$ | $\nu_{10} = 52.3$ |
| $r_{19} = -92.233$ | $d_{19} = 8.153$ | | |
| $r_{20} = 619.643$ | $d_{20} = 15.083$ | $n_{11} = 1.6968$ | $\nu_{11} = 55.6$ |
| $r_{21} = -186.5$ | | | |
| Back focal length Bf = 153.84 | | | |

The air space $d_{19}$ between a positive meniscus lens $L_9$ having its convex surface facing the image side and a biconvex positive lens $L_{10}$ most adjacent to the image side is 8.153 mm when the object distance is infinity, and 4.627 mm when the distance is minimum and the photographing magnification $\beta = 1/30$.

Figure 2B:
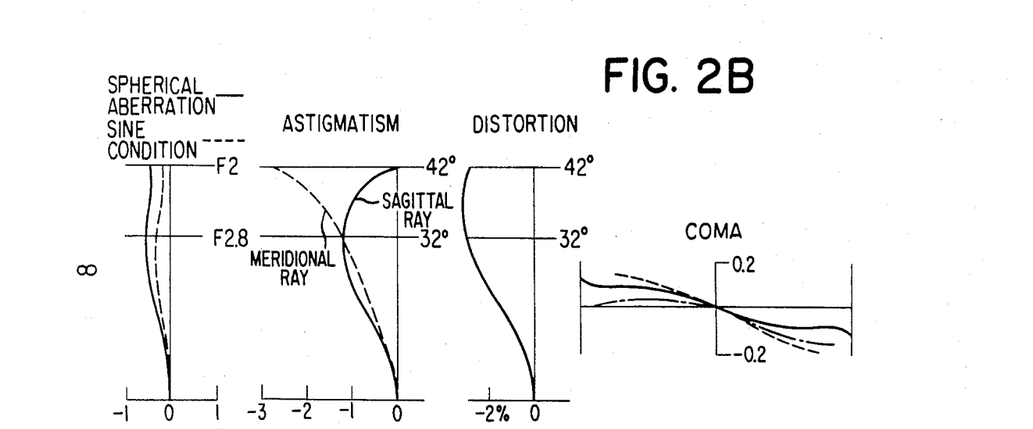
Figure 2C:
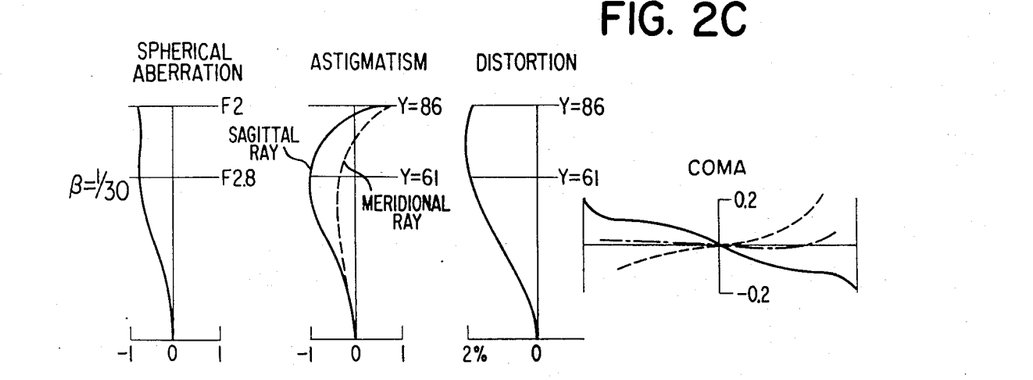
Figure 2D:
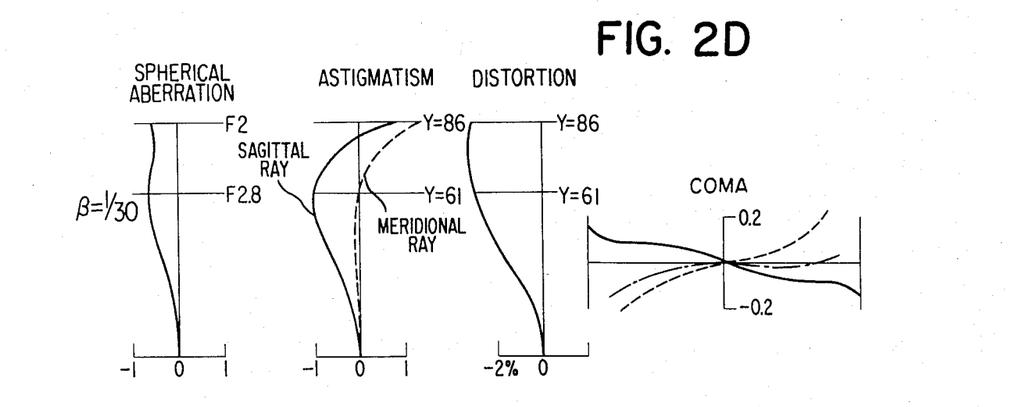

The focused condition of the second embodiment of an infinite object and various aberrations therein when the photographing magnification $\beta = 1/30$ are shown in FIGS. 2B and 2C, respectively. Also, various aberrations by the entire system shifting lens when the photographing magnification $\beta = 1/30$ are shown in FIG. 2D for comparison. The amount of movement of the entire lens system necessary for the entire system shifting focusing to obtain the photographing magnification $\beta = 1/30$ is 3.328 mm. Again, in the present embodiment it is seen that, substantially similarly to the first embodiment, astigmatism is corrected in the negative direction and distortion is corrected in the positive direction.

Figure 3A:
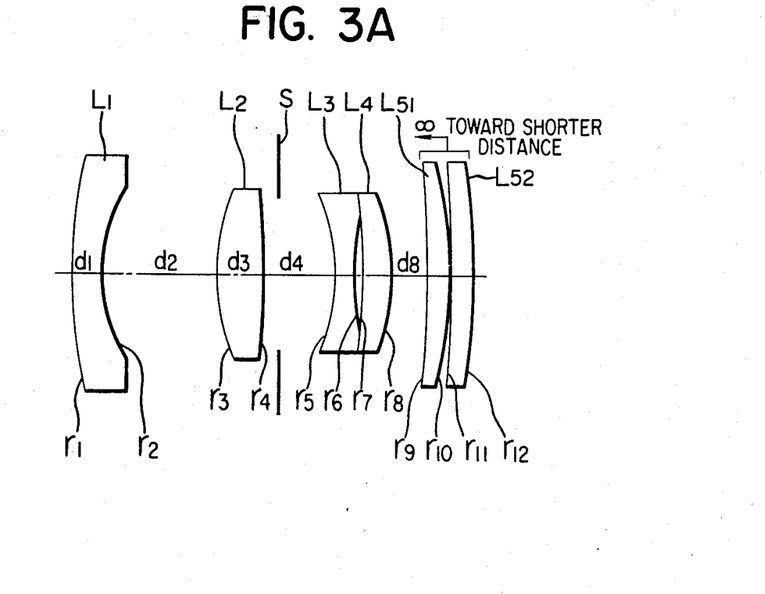

FIG. 3A shows the lens construction according to a third embodiment of the present invention. As shown, a divergent forward group comprises a negative meniscus lens component $L_1$, and a convergent rearward group comprises, in succession from the object side, a positive lens component $L_2$, a diaphragm S, a biconcave negative lens component $L_3$, a positive meniscus lens component $L_4$ having its convex surface facing the image side, and two positive lens components $L_{51}$, $L_{52}$. The two positive lens components $L_{51}$, $L_{52}$ form a focusing lens member. These two positive lens components $L_{51}$ and $L_{52}$ are movable together and the focusing may be effected by moving these two lens components. Again in this case, the disadvantage of an inverted telephoto lens in that astigmatism and distortion are varied with variations in photographing magnification is also alleviated.

Numerical data of the third embodiment will be shown below.

| Third Embodiment Total focal length f = 100, F-number 2.8, Angle of view 62° | | | |
|---|---|---|---|
| $r_1 = 173.61$ | $d_1 = 8.33$ | $n_1 = 1.5168$ | $\nu_1 = 64.2$ |
| $r_2 = 48.89$ | $d_2 = 35.56$ | | |
| $r_3 = 75.0$ | $d_3 = 13.89$ | $n_2 = 1.80279$ | $\nu_2 = 46.8$ |
| $r_4 = -277.78$ | $d_4 = 21.94$ | | |
| $r_5 = -65.56$ | $d_5 = 6.39$ | $n_3 = 1.74$ | $\nu_3 = 28.2$ |
| $r_6 = 126.1$ | $d_6 = 2.33$ | | |
| $r_7 = -213.89$ | $d_7 = 9.53$ | $n_4 = 1.62041$ | $\nu_4 = 60.3$ |
| $r_8 = -52.78$ | $d_8 = 10.555$ | | |
| $r_9 = -833.33$ | $d_9 = 6.67$ | $n_5 = 1.713$ | $\nu_5 = 53.9$ |
| $r_{10} = -125.0$ | $d_{10} = 0.28$ | | |
| $r_{11} = -1250.0$ | $d_{11} = 6.67$ | $n_6 = 1.67025$ | $\nu_6 = 57.5$ |
| $r_{12} = -203.46$ | | | |
| Back focal length Bf = 102.83 | | | |
| f' = 485.9 | | | |
| f'' = 139.33 | | | |

When the focusing is obtained by moving $L_{51}$ and $L_{52}$ together, the variable space $d_8 = 7.958$ when $\beta = 1/40$.

Figure 3B:
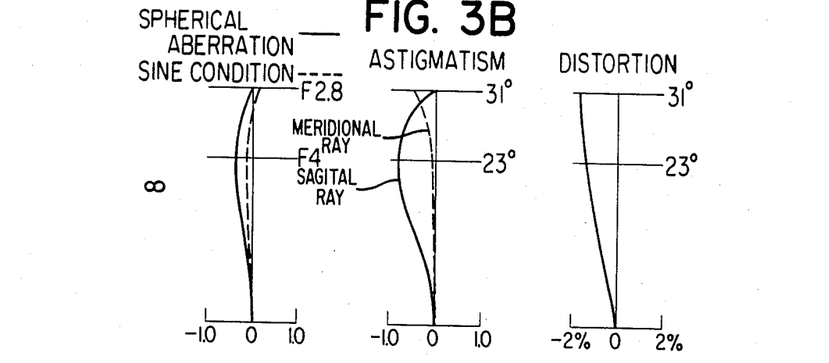
Figure 3C:
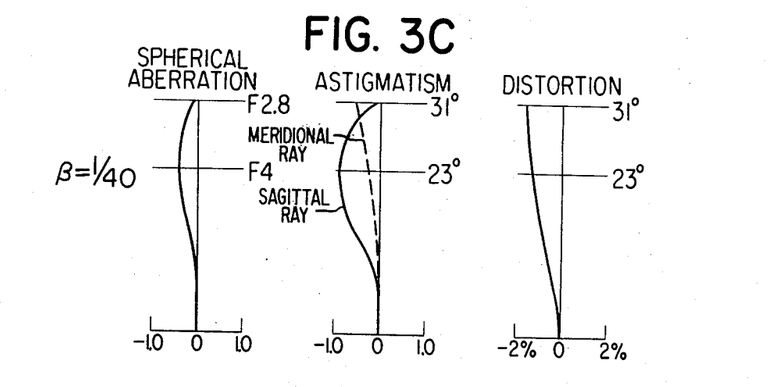

Various aberrations in the third embodiment when in the focused condition to infinity are shown in FIG. 3B, and various aberrations therein when the photographing magnification $\beta = 1/40$ during the focused condition to a short distance are shown in FIG. 3C. From the comparison between these illustrations of aberrations, it is seen that even at the short distance, astigmatism is maintained particularly well corrected. In the present embodiment, when the influence imparted to aberrations by the variable space $d_8$ is considered, it is desirable that the relation between the total focal length f' of the lens components lying forwardly of the variable space $d_8$ and the total focal length f of the entire system satisfy the relationship $|f'| > 2f$.

Figure 3D:
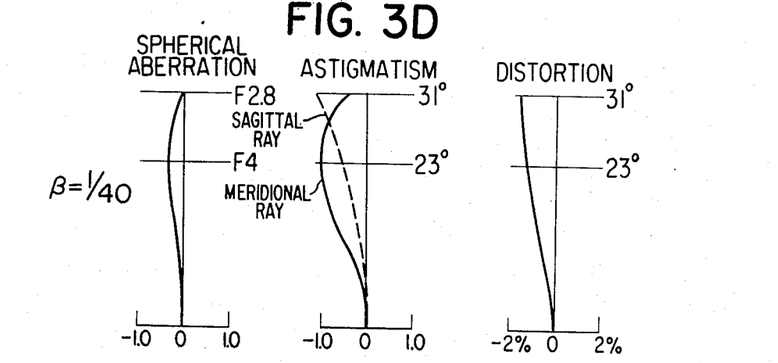

Also, in the third embodiment, the positive lenses $L_{51}$ and $L_{52}$ as the focusing lens member are moved together to effect the focusing. It is also possible to move only the positive lens $L_{51}$, the second lens component as viewed from the image side, and effect focusing by movement of this positive lens $L_{51}$ alone. Various aberrations when the photographing magnification $\beta = 1/40$ during the short distance focused condition by such focusing are shown in FIG. 3D. At this time, variable spaces in the foregoing table of numerical data are $d_8$ and $d_{10}$, which are 5.305 and 5.53, respectively. From the illustration of aberrations, it is seen that a well-corrected condition is again maintained. In this case, it is desirable that the total focal length f' of the lens components lying forwardly of the positive lens $L_{51}$ be in the range of 3f>f''>f to further reduce the variations in various aberrations and the amount of shifting of the positive lens $L_{51}$.

Figure 4A:
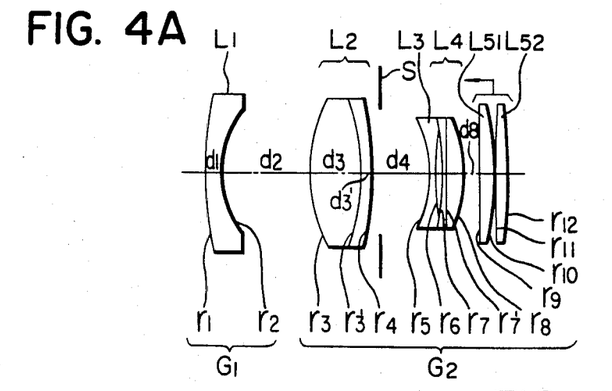
Figure 5A:
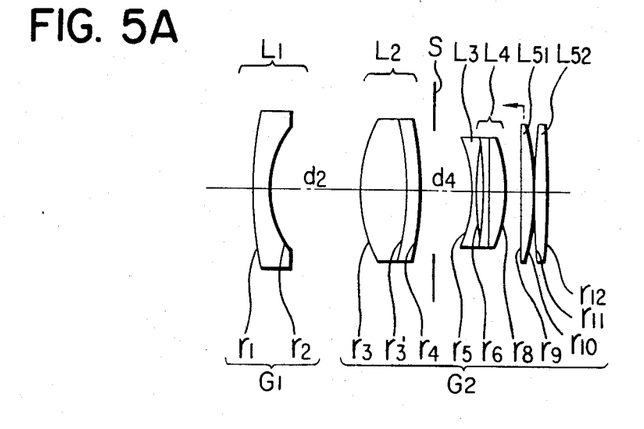

Embodiments having a focusing lens member similar to that of the above-described third embodiment are the fourth and fifth embodiments shown in FIGS. 4A and 5A, respectively.

Figure 4B:
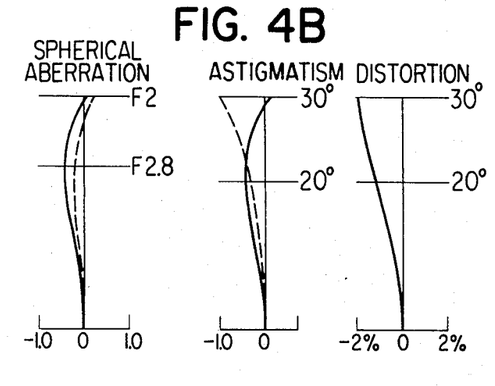
Figure 4C:
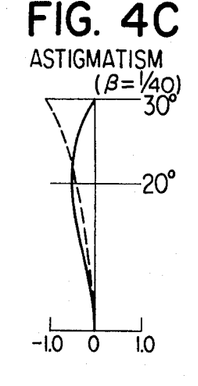

In the fourth embodiment, as shown in FIG. 4A, two positive lenses $L_{51}$ and $L_{52}$ forming a focusing lens member are moved together to thereby accomplish focusing. The aberrations in the fourth embodiment are shown in FIG. 4B and it will be apparent from the illustration of astigmatism at the photographing magnification that the variation of the image plane is slight.

Figure 5B:
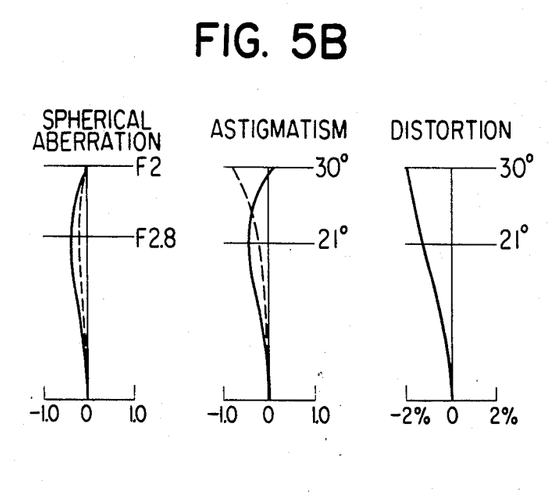
Figure 5C:
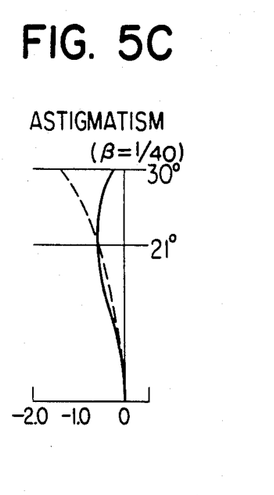

In the fifth embodiment shown in FIG. 5A, focusing is accomplished by moving only the lens $L_{51}$, the second most adjacent to the image side of the two positive lenses $L_{51}$ and $L_{52}$, which forms a focusing lens member. Again in this case, the focusing mechanism is simplified and the variation of the image plane resulting from a variation in photographing magnification is also reduced. Various aberrations in the fifth embodiment are shown in FIG. 5B. In the fourth and fifth embodiments, it is desirable that the variable space $d_8$ lying immediately rearwardly of the positive meniscus lens component $L_4$ having its convex surface facing the image side satisfy the relationship $d_8>0.2$ f.

Numerical data of the fourth and fifth embodiments will be shown below.

Fourth Embodiment
Total focal length f = 100, F-number 2.0, Angle of view 60°

| | | | |
|---|---|---|---|
| $r_1$ = 241.21 | $d_1$ = 8.04 | $n_1$ = 1.5168 | $\nu_1$ = 64.2 |
| $r_2$ = 53.77 | $d_2$ = 50.75 | | |
| $r_3$ = 96.73 | $d_3$ = 28.14 | $n_2$ = 1.78797 | $\nu_2$ = 47.5 |
| $r_3'$ = −140.70 | $d_3'$ = 7.54 | $n_2'$ = 1.7552 | $\nu_2'$ = 27.5 |
| $r_4$ = −189.45 | $d_4$ = 33.17 | | |
| $r_5$ = −66.13 | $d_5$ = 2.51 | $n_3$ = 1.7847 | $\nu_3$ = 26.1 |
| $r_6$ = 192.46 | $d_6$ = 3.79 | | |
| $r_7$ = −213.57 | $d_7$ = 2.01 | $n_4$ = 1.79504 | $\nu_4$ = 28.4 |
| $r_7'$ = −5025.13 | $d_7'$ = 9.55 | $n_4'$ = 1.78797 | $\nu_4'$ = 47.5 |
| $r_8$ = −67.84 | $d_8$ = 9.045 | | |
| $r_9$ = −3208.54 | $d_9$ = 7.04 | $n_5$ = 1.84042 | $\nu_5$ = 43.3 |
| $r_{10}$ = −154.02 | $d_{10}$ = 0.25 | | |
| $r_{11}$ = 1469.85 | $d_{11}$ = 5.53 | $n_6$ = 1.84042 | $\nu_6$ = 43.3 |
| $r_{12}$ = −500.65 | | | |

Back focal length Bf = 102.19

When $\beta=1/40$, $L_{51}$ and $L_{52}$ are moved together and the variable space $d_8=6.427$.

Fifth Embodiment
Total focal length f = 100, F-number 2.0, Angle of view 60°

| | | | |
|---|---|---|---|
| $r_1$ = 239.27 | $d_1$ = 8.38 | $n_1$ = 1.51835 | $\nu_1$ = 60.3 |
| $r_2$ = 54.19 | $d_2$ = 51.57 | | |
| $r_3$ = 97.91 | $d_3$ = 30.63 | $n_2$ = 1.78797 | $\nu_2$ = 47.5 |
| $r_3'$ = −141.36 | $d_3'$ = 7.33 | $n_2'$ = 1.7552 | $\nu_2'$ = 27.5 |
| $r_4$ = −186.7 | $d_4$ = 33.25 | | |
| $r_5$ = −66.99 | $d_5$ = 3.14 | $n_3$ = 1.7847 | $\nu_3$ = 26.1 |
| $r_6$ = 195.03 | $d_6$ = 3.9 | | |
| $r_7$ = −195.55 | $d_7$ = 2.09 | $n_4$ = 1.7847 | $\nu_4$ = 26.1 |
| $r_7'$ = ∞ | $d_7'$ = 7.85 | $n_4'$ = 1.80218 | $\nu_4'$ = 44.7 |
| $r_8$ = −69.37 | $d_8$ = 9.686 | | |
| $r_9$ = −3259.16 | $d_9$ = 7.07 | $n_5$ = 1.84042 | $\nu_5$ = 43.3 |
| $r_{10}$ = −156.55 | $d_{10}$ = 0.26 | | |
| $r_{11}$ = 1492.15 | $d_{11}$ = 5.76 | $n_6$ = 1.84042 | $\nu_6$ = 43.3 |

-continued
Fifth Embodiment
Total focal length f = 100, F-number 2.0, Angle of view 60°

$r_{12}$ = −406.85

Back focal length Bf = 101.05

When $\beta=1/40$, the variable spaces $d_8$ and $d_{10}$ are $d_8=4.686$ and $d_{10}=5.26$.

Figure 6A:
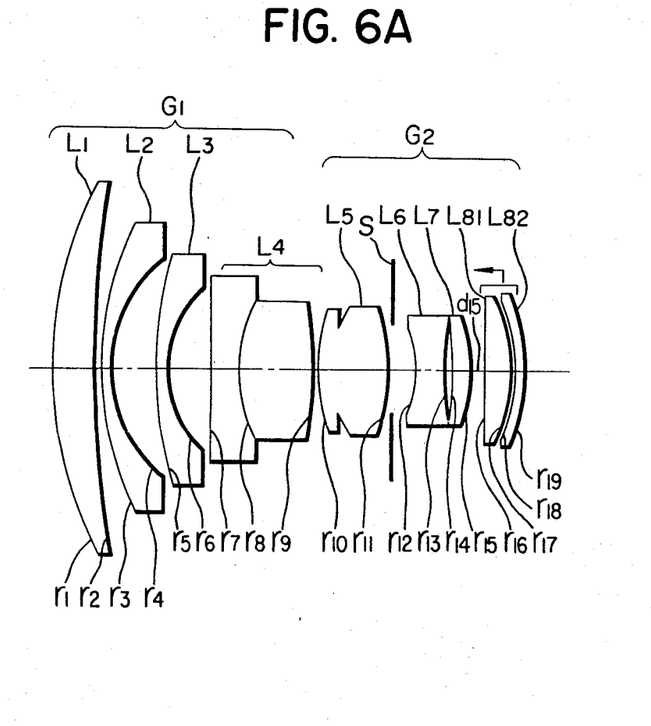

Description will now be made of a sixth embodiment shown in FIG. 6A. In this embodiment, a divergent forward group comprises, in succession from the object side, a positive meniscus lens component $L_1$ having its convex surface facing the object side, two negative meniscus lens components $L_2$, $L_3$ having their convex surfaces facing the object side, and a lens component $L_4$ consisting of a negative lens and a positive lens cemented together, and a convergent rearward group comprises, in succession from the object side, a positive lens component $L_5$, a biconcave negative lens component $L_6$, a positive meniscus lens component $L_7$ having its convex surface facing the image side, a positive lens component $L_{81}$ and a meniscus lens component $L_{82}$ having its convex surface facing the image side. The positive lens component $L_{81}$ and the meniscus lens component $L_{82}$ together form a focusing lens member and have a composite positive refractive power. These two lens components $L_{81}$ and $L_{82}$ are movable together in the direction of the optical axis and focusing is accomplished by movement of these two lens components.

Numerical data of the present embodiment will be shown below.

Sixth Embodiment
Total focal length f = 100, F-number 4.0, Angle of view 90°

| | | | |
|---|---|---|---|
| $r_1$ = 187.0 | $d_1$ = 19.58 | $n_1$ = 1.50032 | $\nu_1$ = 81.9 |
| $r_2$ = 490.62 | $d_2$ = 0.35 | | |
| $r_3$ = 130.86 | $d_3$ = 3.50 | $n_2$ = 1.50032 | $\nu_2$ = 81.9 |
| $r_4$ = 59.09 | $d_4$ = 20.63 | | |
| $r_5$ = 143.36 | $d_5$ = 3.85 | $n_3$ = 1.60729 | $\nu_3$ = 59.5 |
| $r_6$ = 50.35 | $d_6$ = 20.98 | | |
| $r_7$ = 1398.60 | $d_7$ = 13.99 | $n_4$ = 1.77279 | $\nu_4$ = 49.4 |
| $r_8$ = 67.13 | $d_8$ = 34.97 | $n_5$ = 1.62004 | $\nu_5$ = 36.3 |
| $r_9$ = −274.91 | $d_9$ = 0.35 | | |
| $r_{10}$ = 103.15 | $d_{10}$ = 37.76 | $n_6$ = 1.58913 | $\nu_6$ = 61.2 |
| $r_{11}$ = −101.05 | $d_{11}$ = 11.89 | | |
| $r_{12}$ = −70.28 | $d_{12}$ = 14.69 | $n_7$ = 1.75692 | $\nu_7$ = 31.7 |
| $r_{13}$ = 178.32 | $d_{13}$ = 1.71 | | |
| $r_{14}$ = −335.66 | $d_{14}$ = 8.39 | $n_8$ = 1.62299 | $\nu_8$ = 58.1 |
| $r_{15}$ = −69.23 | $d_{15}$ = 6.99 | | |
| $r_{16}$ = −839.16 | $d_{16}$ = 10.49 | $n_9$ = 1.6228 | $\nu_9$ = 56.9 |
| $r_{17}$ = −69.93 | $d_{17}$ = 0.35 | | |
| $r_{18}$ = −73.43 | $d_{18}$ = 3.50 | $n_{10}$ = 1.62588 | $\nu_{10}$ = 35.6 |
| $r_{19}$ = −86.73 | | | |

Back focal length Bf = 167.24
f' = −670.42
f'' = 82.17

Where the focusing is obtained by moving $L_{81}$ and $L_{82}$ together, the variable space $d_{15}=4.44$ when $\beta=1/40$.

Figure 6B:
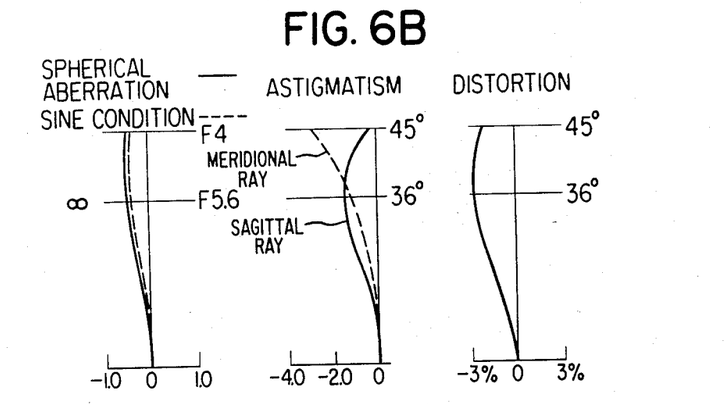
Figure 6C:
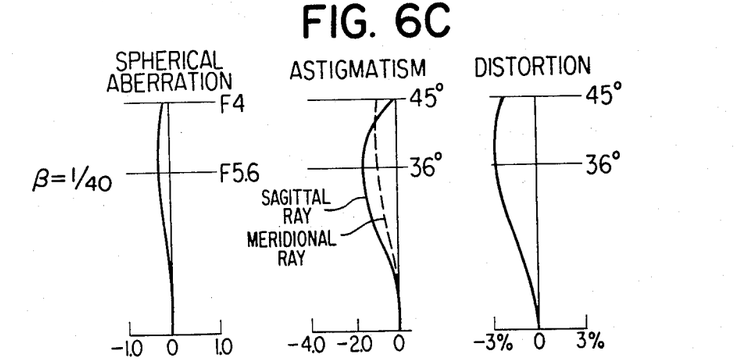

Again, in the sixth embodiment the mechanism for moving the lens for the focusing is simplified and, as seen from FIGS. 6B and 6C, various aberrations are well corrected even at short distances. FIG. 6B shows the aberrations during infinity focusing, and FIG. 6C shows the aberrations when the photographing magnification $\beta=1/40$ during short distance focusing. In this case, it is desirable that the total focal length f' of the lens components lying forwardly of the variable space $d_{15}$ be given in the range of $|f'|>2$ f.

Figure 6D:
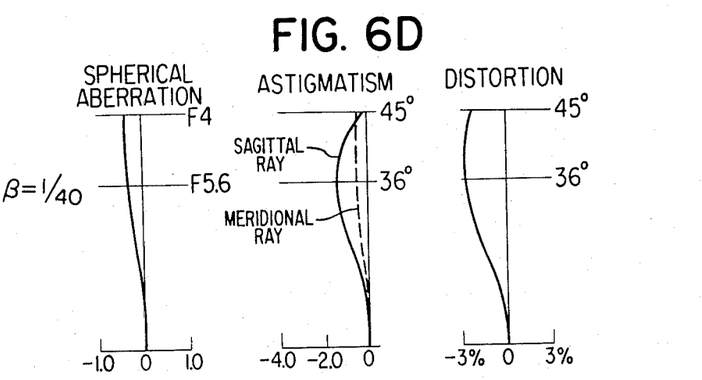

Also, in the sixth embodiment, it is possible to move only the positive lens component $L_{81}$ of the positive lens component $L_{81}$ and meniscus lens component $L_{82}$ pair as the focusing lens member, and to accomplish the focusing by movement of this lens component $L_{81}$. Again, in this case the mechanism for the focusing is simple and the variation in astigmatism is alleviated. In FIG. 6D, various aberrations when the photographing magnification $\beta = 1/40$ are shown as an example of such case, and it is seen therefrom that the variation in astigmatism is small. The variable spaces $d_{15}$ and $d_{17}$ and 5.28 and 2.06, respectively, when $\beta = 1/40$. To render the variation in spherical aberration smaller in such a focusing system, it is desirable that the total focal length f' of the lens components lying forwardly of the positive lens component $L_{81}$ be in the range of $0.6f < f' < f$.

Figure 7A:
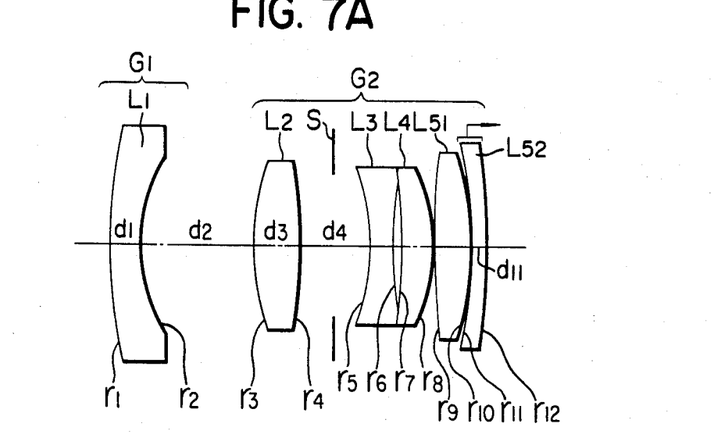

Now, in a seventh embodiment of the present invention, a positive lens component and a negative lens component are provided as a focusing lens member disposed most adjacent to the image side, and focusing is accomplished by moving the negative lens component. In the present embodiment, as shown in FIG. 7A, a divergent forward group comprises a negative meniscus lens component $L_1$ having its convex surface facing the object side, and a convergent rearward group comprises, in succession from the object side, a positive lens component $L_2$, a diaphragm S, a biconcave lens component $L_3$, a positive meniscus lens component $L_4$ having its convex surface facing the image side, a biconvex positive lens component $L_{51}$, and a negative meniscus lens $L_{52}$ having its convex surface facing the image side. The biconvex positive lens component $L_{51}$ and the negative meniscus lens component $L_{52}$ together constitute a focusing lens member and their composite refractive force is positive. Focusing is accomplished by moving the negative meniscus lens component $L_{52}$ alone. Numerical data of the present embodiment will be shown below.

Seventh Embodiment
Total focal length f = 100, F-number 2.8, Angle of view 57°

| | | | |
|---|---|---|---|
| $R_1 = 172.78$ | $d_1 = 5.0$ | $n_1 = 1.51835$ | $\nu_1 = 60.3$ |
| $R_2 = 48.61$ | $d_2 = 33.89$ | | |
| $R_3 = 73.33$ | $d_3 = 17.22$ | $n_2 = 1.74443$ | $\nu_2 = 49.4$ |
| $R_4 = -249.72$ | $d_4 = 24.17$ | | |
| $R_5 = -59.44$ | $d_5 = 8.61$ | $n_3 = 1.74077$ | $\nu_3 = 27.7$ |
| $R_6 = 142.78$ | $d_6 = 3.47$ | | |
| $R_7 = -172.22$ | $d_7 = 9.44$ | $n_4 = 1.713$ | $\nu_4 = 53.9$ |
| $R_8 = -52.78$ | $d_8 = 0.28$ | | |
| $R_9 = 277.78$ | $d_9 = 11.11$ | $n_5 = 1.713$ | $\nu_5 = 53.9$ |
| $R_{10} = -97.22$ | $d_{10} = 0.28$ | | |
| $R_{11} = -125.0$ | $d_{11} = 3.89$ | $n_6 = 1.713$ | $\nu_6 = 53.9$ |
| $R_{12} = -212.5$ | | | |

Back focal length Bf = 105.89
f' = 79.6

Where focusing is obtained by moving $L_6$ toward the image side, the variable space $d_{10} = 4.694$ when $\beta = 1/40$.

Figure 7B:
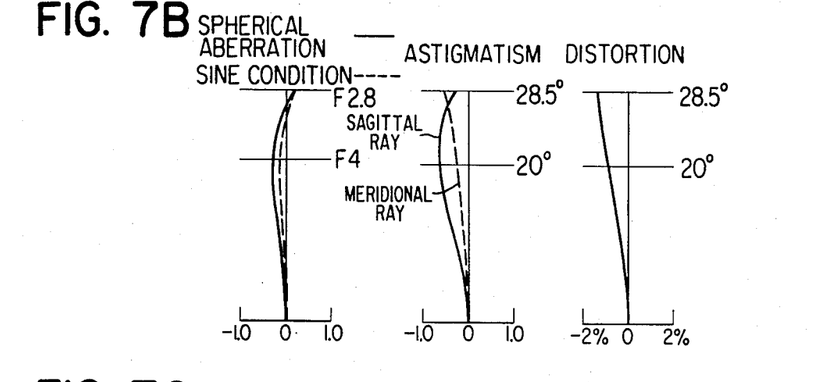
Figure 7C:
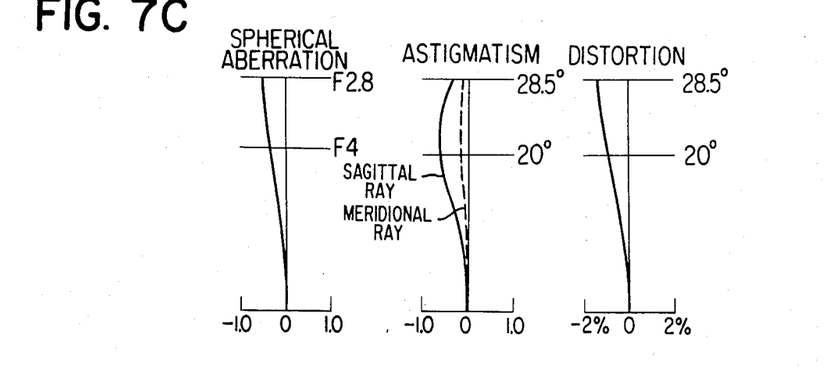

Aberrations in the present embodiment during infinity focusing are shown in FIG. 7B, and aberrations therein when the photographing magnification $\beta = 1/40$ during short distance focusing are shown in FIG. 7C. Again, in this case the focusing mechanism is very simple and a practically sufficient image forming performance is maintained even at short distances.

In each of the above-described embodiments, the positive lens component, the positive meniscus lens component or the biconcave lens component in the convergent rearward group is provided by a doublet, but such doublet is not always necessary if a slight variation in chromatic aberration can be allowed.

In the wide angle photographic lens of the present invention as described above, focusing may be accomplished by a very simple construction in which only a part of the lens system is simply moved. Further, this movable part is located most adjacent to the image side. This is advantageous in that the interlocking mechanism with the camera body can be made simpler, and well-corrected conditions of the various aberrations can be maintained even for short distances.

I claim:

1. A wide angle photographic lens which can be focused by a simple mechanism, comprising:
   a divergent forward group having a negative meniscus lens component having its convex surface facing the object side; and
   a convergent rearward group having a diaphragm, a positive lens component disposed forwardly of said diaphragm, a biconcave negative lens component disposed rearwardly of said diaphragm, a positive meniscus lens component having its convex surface facing the image side, all of said lens components of the forward and the rearward groups being fixed with respect to the image plane, and a focusing lens member disposed most adjacent to the image side;
   said focusing lens member comprising a lens movable in the direction of the optical axis, and focusing being effected by such movement of said movable lens alone.

2. A wide angle photographic lens according to claim 1, wherein said focusing lens member is a single positive lens movable in the direction of the optical axis.

3. A wide angle photographic lens according to claim 1, wherein said focusing lens member comprises two positive lenses, one of which is movable in the direction of the optical axis.

4. A wide angle photographic lens according to claim 1, wherein said focusing lens member has, in succession from the object side, a positive lens and a negative meniscus lens having its convex surface facing the image side, said two lenses being separate from each other, one of said two lenses being movable in the direction of the optical axis.

5. A wide angle photographic lens which can be focused by a simple mechanism, comprising:
   a divergent forward group having a negative meniscus lens component with its convex surface facing the object side; and
   a convergent rearward group having a diaphragm, a positive lens component disposed forwardly of said diaphragm, a biconcave negative lens component disposed rearwardly of said diaphragm, a positive meniscus lens component having its convex surface facing the image side, and a focusing lens member disposed most adjacent to the image side;
   said focusing lens member comprising a single positive lens movable in the direction of the optical axis, and focusing being effected by such movement of the movable lens alone; and
   wherein numerical data are as follows:

| | | | |
|---|---|---|---|
| $r_1 = 144.045$ | $d_1 = 7.425$ | $n_1 = 1.50137$ | $\nu_1 = 56.5$ |
| $r_2 = 48.015$ | $d_2 = 33.908$ | | |
| $r_3 = 73.755$ | $d_3 = 17.325$ | $n_2 = 1.78797$ | $\nu_2 = 47.5$ |
| $r_4 = -275.468$ | $d_4 = 21.533$ | | |
| $r_5 = -62.865$ | $d_5 = 7.425$ | $n_3 = 1.75692$ | $\nu_3 = 31.7$ |

-continued

| | | | |
|---|---|---|---|
| $r_6 = 132.908$ | $d_6 = 2.871$ | | |
| $r_7 = -175.725$ | $d_7 = 1.980$ | $n_4 = 1.7847$ | $\nu_4 = 26.1$ |
| $r_8 = 309.375$ | $d_8 = 9.034$ | $n_5 = 1.78797$ | $\nu_5 = 47.5$ |
| $r_9 = -51.975$ | $d_9 = 9.405$ | | |
| $r_{10} = 371.25$ | $d_{10} = 7.425$ | $n_6 = 1.78797$ | $\nu_6 = 47.5$ |
| $r_{11} = -210.798$ | | | |
| Back focal length Bf = 98.547 | | | |

6. A wide angle photographic lens which can be focused by a simple mechanism, comprising:
   a divergent forward group having a negative meniscus lens component with its convex surface facing the object side; and
   a convergent rearward group having a diaphragm, a positive lens component disposed forwardly of said diaphragm, a biconcave negative lens component disposed rearwardly of said diaphragm, a positive meniscus lens component having its convex surface facing the image side, and a focusing lens member disposed most adjacent to the image side;
   said focusing lens member comprising a single positive lens movable in the direction of the optical axis, and focusing being effected by such movement of the movable lens alone; and
   wherein the numerical data are as follows:

| | | | |
|---|---|---|---|
| $r_1 = 379.128$ | $d_1 = 17.122$ | $n_1 = 1.66557$ | $\nu_1 = 53.3$ |
| $r_2 = 1977.151$ | $d_2 = 0.815$ | | |
| $r_3 = 203.113$ | $d_3 = 17.937$ | $n_2 = 1.713$ | $\nu_2 = 53.9$ |
| $r_4 = -60.089$ | $d_4 = 13.657$ | | |
| $r_5 = -128.617$ | $d_5 = 5.3$ | $n_3 = 1.6968$ | $\nu_3 = 55.6$ |
| $r_6 = 64.003$ | $d_6 = 15.083$ | | |
| $r_7 = -247.45$ | $d_7 = 26.906$ | $n_4 = 1.65844$ | $\nu_4 = 50.8$ |
| $r_8 = -2561.328$ | $d_8 = 0.408$ | | |
| $r_9 = 157.479$ | $d_9 = 4.484$ | $n_5 = 1.6968$ | $\nu_5 = 55.6$ |
| $r_{10} = 93.762$ | $d_{10} = 8.969$ | | |
| $r_{11} = 125.461$ | $d_{11} = 31.39$ | $n_6 = 1.7495$ | $\nu_6 = 35.0$ |
| $r_{12} = -933.541$ | $d_{12} = 8.153$ | | |
| $r_{13} = -1844.376$ | $d_{13} = 20.791$ | $n_7 = 1.56384$ | $\nu_7 = 60.8$ |
| $r_{14} = -93.150$ | $d_{14} = 19.160$ | | |
| $r_{15} = -114.145$ | $d_{15} = 9.784$ | $n_8 = 1.74443$ | $\nu_8 = 49.4$ |
| $r_{16} = -102.73$ | $d_{16} = 3.261$ | $n_9 = 1.80518$ | $\nu_9 = 25.5$ |
| $r_{17} = -226.659$ | $d_{17} = 5.137$ | | |
| $r_{18} = -696.014$ | $d_{18} = 13.860$ | $n_{10} = 1.7481$ | $\nu_{10} = 52.3$ |
| $r_{19} = -92.233$ | $d_{19} = 8.153$ | | |
| $r_{20} = 619.643$ | $d_{20} = 15.083$ | $n_{11} = 1.6968$ | $\nu_{11} = 55.6$ |
| $r_{21} = -210.5$ | | | |
| Back focal length Bf = 153.847 | | | |

7. A wide angle photographic lens which can be focused by a simple mechanism, comprising:
   a divergent forward group having a negative meniscus lens component with its convex surface facing the object side; and
   a convergent rearward group having a diaphragm, a positive lens component disposed forwardly of said diaphragm, a biconcave negative lens component disposed rearwardly of said diaphragm, a positive meniscus lens component having its convex surface facing the image side, and a focusing lens member disposed most adjacent to the image side;
   said focusing lens member comprising two positive lenses, one of which is movable in the direction of the optical axis, and focusing being effected by such movement of said movable lens alone; and
   wherein numerical data are as follows:

| | | | |
|---|---|---|---|
| $r_1 = 173.61$ | $d_1 = 8.33$ | $n_1 = 1.5168$ | $\nu_1 = 64.2$ |
| $r_2 = 48.89$ | $d_2 = 35.56$ | | |
| $r_3 = 75.0$ | $d_3 = 13.89$ | $n_2 = 1.80279$ | $\nu_2 = 46.8$ |

-continued

| | | | |
|---|---|---|---|
| $r_4 = -277.78$ | $d_4 = 21.94$ | | |
| $r_5 = -65.56$ | $d_5 = 6.39$ | $n_3 = 1.74$ | $\nu_3 = 28.2$ |
| $r_6 = 126.1$ | $d_6 = 2.33$ | | |
| $r_7 = -213.89$ | $d_7 = 9.53$ | $n_4 = 1.62041$ | $\nu_4 = 60.3$ |
| $r_8 = -52.78$ | $d_8 = 10.555$ | | |
| $r_9 = -833.33$ | $d_9 = 6.67$ | $n_5 = 1.713$ | $\nu_5 = 53.9$ |
| $r_{10} = -125.0$ | $d_{10} = 0.28$ | | |
| $r_{11} = -1250.0$ | $d_{11} = 6.67$ | $n_6 = 1.67025$ | $\nu_6 = 57.5$ |
| $r_{12} = -203.46$ | | | |
| Back focal length Bf = 102.83 | | | |
| f' = 485.9 | | | |
| f'' = 139.33 | | | |

8. A wide angle photographic lens which can be focused by a simple mechanism, comprising:
   a divergent forward group having a negative meniscus lens component with its convex surface facing the object side; and
   a convergent rearward group having a diaphragm, a positive lens component disposed forwardly of said diaphragm, a biconcave negative lens component disposed rearwardly of said diaphragm, a positive meniscus lens component having its convex surface facing the image side, and a focusing lens member disposed most adjacent to the image side;
   said focusing lens member comprising two positive lenses, one of which is movable in the direction of the optical axis, and focusing being effected by such movement of said movable lens alone; and
   wherein numerical data are as follows:

| | | | |
|---|---|---|---|
| $r_1 = 241.21$ | $d_1 = 8.04$ | $n_1 = 1.5168$ | $\nu_1 = 64.2$ |
| $r_2 = 53.77$ | $d_2 = 50.75$ | | |
| $r_3 = 96.73$ | $d_3 = 28.14$ | $n_2 = 1.78797$ | $\nu_2 = 47.5$ |
| $r_{3'} = -140.70$ | $d_{3'} = 7.54$ | $n_{2'} = 1.7552$ | $\nu_{2'} = 27.5$ |
| $r_4 = -189.45$ | $d_4 = 33.17$ | | |
| $r_5 = -66.13$ | $d_5 = 2.51$ | $n_3 = 1.7847$ | $\nu_3 = 26.1$ |
| $r_6 = 192.46$ | $d_6 = 3.79$ | | |
| $r_7 = -213.57$ | $d_7 = 2.01$ | $n_4 = 1.79504$ | $\nu_4 = 28.4$ |
| $r_{7'} = -5025.13$ | $d_{7'} = 9.55$ | $n_{4'} = 1.78797$ | $\nu_{4'} = 47.5$ |
| $r_8 = -67.84$ | $d_8 = 9.045$ | | |
| $r_9 = -3208.54$ | $d_9 = 7.04$ | $n_5 = 1.84042$ | $\nu_5 = 43.3$ |
| $r_{10} = -154.02$ | $d_{10} = 0.25$ | | |
| $r_{11} = 1469.85$ | $d_{11} = 5.53$ | $n_6 = 1.84042$ | $\nu_6 = 43.3$ |
| $r_{12} = -500.65$ | | | |
| Back focal length Bf = 102.19 | | | |

9. A wide angle photographic lens which can be focused by a simple mechanism, comprising:
   a divergent forward group having a negative meniscus lens component with its convex surface facing the object side; and
   a convergent rearward group having a diaphragm, a positive lens component disposed forwardly of said diaphragm, a biconcave negative lens component disposed rearwardly of said diaphragm, a positive meniscus lens component having its convex surface facing the image side, and a focusing lens member disposed most adjacent to the image side;
   said focusing lens member comprising two positive lenses, one of which is movable in the direction of the optical axis, and focusing being effected by such movement of said movable lens alone; and
   wherein numerical data are as follows:

| | | | |
|---|---|---|---|
| $r_1 = 239.27$ | $d_1 = 8.38$ | $n_1 = 1.51824$ | $\nu_1 = 60.3$ |
| $r_2 = 54.19$ | $d_2 = 51.57$ | | |
| $r_3 = 97.91$ | $d_3 = 30.63$ | $n_2 = 1.78797$ | $\nu_2 = 47.5$ |
| $r_{3'} = -141.36$ | $d_{3'} = 7.33$ | $n_{2'} = 1.7552$ | $\nu_{2'} = 27.5$ |
| $r_4 = -186.7$ | $d_4 = 33.25$ | | |
| $r_5 = -66.99$ | $d_5 = 3.14$ | $n_3 = 1.7847$ | $\nu_3 = 26.1$ |
| $r_6 = 195.03$ | $d_6 = 3.9$ | | |
| $r_7 = -195.55$ | $d_7 = 2.09$ | $n_4 = 1.7847$ | $\nu_4 = 26.1$ |
| $r_{7'} = -\infty$ | $d_{7'} = 7.85$ | $n_{4'} = 1.80218$ | $\nu_{4'} = 44.7$ |
| $r_8 = -69.37$ | $d_8 = 9.686$ | | |
| $r_9 = -3259.16$ | $d_9 = 7.07$ | $n_5 = 1.84042$ | $\nu_5 = 43.3$ |
| $r_{10} = -156.55$ | $d_{10} = 0.26$ | | |
| $r_{11} = 1492.15$ | $d_{11} = 5.76$ | $n_6 = 1.84042$ | $\nu_6 = 43.3$ |
| $r_{12} = -406.85$ | | | |

Back focal length $Bf = 101.05$

10. A wide angle photographic lens which can be focused by a simple mechanism, comprising:

a divergent forward group having a negative meniscus lens component with its convex surface facing the object side; and a convergent rearward group having a diaphragm, a positive lens component disposed forwardly of said diaphragm, a biconcave negative lens component disposed rearwardly of said diaphragm, a positive meniscus lens component having its convex surface facing the image side, and a focusing lens member disposed most adjacent to the image side;

said focusing member comprising, in succession from the object side, a positive lens and a negative meniscus lens having its convex surface facing the image side, said two lenses being separate from each other and one of said two lenses being movable in the direction of the optical axis, and focusing being effected by such movement of said one movable lens alone; and wherein numerical data are as follows:

| | | | |
|---|---|---|---|
| $r_1 = 187.0$ | $d_1 = 19.58$ | $n_1 = 1.50032$ | $\nu_1 = 81.9$ |
| $r_2 = 490.62$ | $d_2 = 0.35$ | | |
| $r_3 = 130.86$ | $d_3 = 3.50$ | $n_2 = 1.50032$ | $\nu_2 = 81.9$ |
| $r_4 = 59.09$ | $d_4 = 20.63$ | | |
| $r_5 = 143.36$ | $d_5 = 3.85$ | $n_3 = 1.60729$ | $\nu_3 = 59.5$ |
| $r_6 = 50.35$ | $d_6 = 20.98$ | | |
| $r_7 = 1398.60$ | $d_7 = 13.99$ | $n_4 = 1.77279$ | $\nu_4 = 49.4$ |
| $r_8 = 67.13$ | $d_8 = 34.97$ | $n_5 = 1.62004$ | $\nu_5 = 36.3$ |
| $r_9 = -274.91$ | $d_9 = 0.35$ | | |
| $r_{10} = 103.15$ | $d_{10} = 37.76$ | $n_6 = 1.58913$ | $\nu_6 = 61.2$ |
| $r_{11} = -101.05$ | $d_{11} = 11.89$ | | |
| $r_{12} = -70.28$ | $d_{12} = 14.69$ | $n_7 = 1.75692$ | $\nu_7 = 31.7$ |
| $r_{13} = 178.32$ | $d_{13} = 1.71$ | | |
| $r_{14} = -335.66$ | $d_{14} = 8.39$ | $n_8 = 1.62299$ | $\nu_8 = 58.1$ |
| $r_{15} = -69.23$ | $d_{15} = 6.99$ | | |
| $r_{16} = -839.16$ | $d_{16} = 10.49$ | $n_9 = 1.6228$ | $\nu_9 = 56.9$ |
| $r_{17} = -69.93$ | $d_{17} = 0.35$ | | |
| $r_{18} = -73.43$ | $d_{18} = 3.50$ | $n_{10} = 1.62588$ | $\nu_{10} = 35.6$ |
| $r_{19} = -86.73$ | | | |

Back focal length $Bf = 167.24$
$f = -670.42$
$f' = 82.17$

11. A wide angle photographic lens which can be focused by a simple mechanism, comprising:

a divergent forward group having a negative meniscus lens component with its convex surface facing the object side; and a convergent rearward group having a diaphragm, a positive lens component disposed forwardly of said diaphragm, a biconcave negative lens component disposed rearwardly of said diaphragm, a positive meniscus lens component having its convex surface facing the image side, and a focusing lens member disposed most adjacent to the image side;

said focusing member comprising, in succession from the object side, a positive lens and a negative meniscus lens having its convex surface facing the image side, said two lenses being separate from each other and one of said two lenses being movable in the direction of the optical axis, and focusing being effected by such movement of said one movable lens alone; and wherein numerical data are as follows:

| | | | |
|---|---|---|---|
| $r_1 = 172.78$ | $d_1 = 5.0$ | $n_1 = 1.51835$ | $\nu_1 = 60.3$ |
| $r_2 = 48.61$ | $d_2 = 33.89$ | | |
| $r_3 = 73.33$ | $d_3 = 17.22$ | $n_2 = 1.74443$ | $\nu_2 = 49.4$ |
| $r_4 = -249.72$ | $d_4 = 24.17$ | | |
| $r_5 = -59.44$ | $d_5 = 8.61$ | $n_3 = 1.74077$ | $\nu_3 = 27.7$ |
| $r_6 = 142.78$ | $d_6 = 3.47$ | | |
| $r_7 = -172.22$ | $d_7 = 9.44$ | $n_4 = 1.713$ | $\nu_4 = 53.9$ |
| $r_8 = -52.78$ | $d_8 = 0.28$ | | |
| $r_9 = 277.78$ | $d_9 = 11.11$ | $n_5 = 1.713$ | $\nu_5 = 53.9$ |
| $r_{10} = -97.22$ | $d_{10} = 0.28$ | | |
| $r_{11} = -125.0$ | $d_{11} = 3.89$ | $n_6 = 1.713$ | $\nu_6 = 53.9$ |
| $r_{12} = -212.5$ | | | |

Back focal length $Bf = 105.89$
$f' = 79.6$

12. A wide angle photographic lens which can be focused by a simple mechanism, comprising:

a divergent forward group having a negative meniscus lens having its convex surface facing the object side; and a convergent rearward group having in succession from the object side, a positive lens, a diaphram, a biconcave lens, a positive meniscus lens having its convex surface facing the image side, and a biconvex positive lens, the biconvex positive lens being a focusing member and being movable in the direction of the optical axis, focusing being effected by the movement of said biconvex positive lens while the other lenses are maintained fixed with respect to the image plane, thereby enabling good correction of aberrations at short object distances.

13. A wide angle photographic lens according to claim 12, wherein said positive meniscus lens consists of a doublet.

14. A wide angle photographic lens according to claim 13, wherein numerical data are as follows:

| | | | |
|---|---|---|---|
| $r_1 = 144.045$ | $d_1 = 7.425$ | $n_1 = 1.50137$ | $\nu_1 = 56.5$ |
| $r_2 = 48.015$ | $d_2 = 33.908$ | | |
| $r_3 = 73.755$ | $d_3 = 17.325$ | $n_2 = 1.78797$ | $\nu_2 = 47.5$ |
| $r_4 = -275.468$ | $d_4 = 21.533$ | | |
| $r_5 = -62.865$ | $d_5 = 7.425$ | $n_3 = 1.75692$ | $\nu_3 = 31.7$ |
| $r_6 = 132.908$ | $d_6 = 2.871$ | | |
| $r_7 = -175.725$ | $d_7 = 1.980$ | $n_4 = 1.7847$ | $\nu_4 = 26.1$ |
| $r_8 = 309.375$ | $d_8 = 9.034$ | $n_5 = 1.78797$ | $\nu_5 = 47.5$ |
| $r_9 = -51.975$ | $d_9 = 9.405$ | | |
| $r_{10} = 371.25$ | $d_{10} = 7.425$ | $n_6 = 1.78797$ | $\nu_6 = 47.5$ |
| $r_{11} = -210.798$ | | | |

Back focal length $Bf = 98.547$

* * * * *